3,328,559
HEATING DEVICE
Joachim Nixdorf, Frankfurt am Main, Bockenheim, Germany, assignor to the Federal Republic of Germany as represented by the Secretary of Defense, Bonn, Germany
Filed Feb. 5, 1965, Ser. No. 430,772
Claims priority, application Germany, Feb. 8, 1964, B 75,415
2 Claims. (Cl. 219—388)

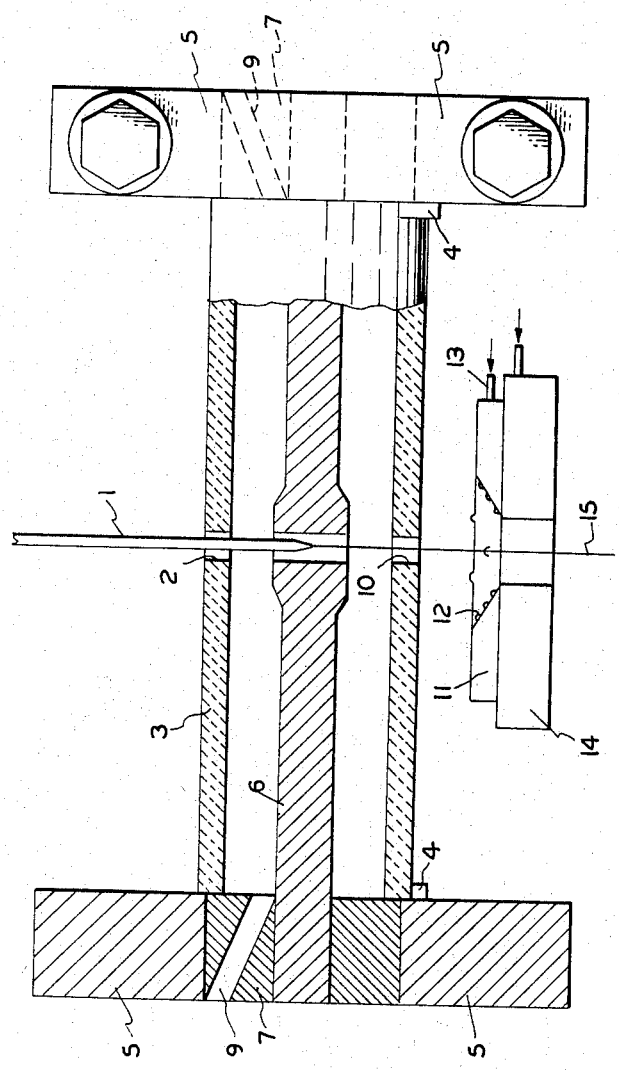

This invention relates to a heating and drawing device for the production of metal filaments enveloped in glass or ceramics from glass or ceramic capillaries or tubes filled with said metal.

In Patent No. 1,793,529, a process has been disclosed where the end of a glass or quartz tube containing a molten metal is drawn through a gas flame whereby the metal is drawn out into filaments of small diameters. Later workers in this field have used fine gas-oxygen burners, metal blocks or electromagnetically produced eddy currents for heating the metal.

Inductive heating has the drawback that a sufficient heat supply in the metal can be produced only before the filament is drawn out to the desired fineness. In the drawn filament itself, the inductively produced heat cannot be properly utilized because, in the drawing operation, the surfaces of the metal are considerably increased and carry off the produced heat so fast that the drawn filament quickly solidifies. The drawing operation is therefore difficult to control, and frequently the glass capillaries crack as a result of the stresses caused by the expansion of the metal which heats up first.

The use of a metal block with a tranverse hole has the drawback that only metals of low melting point and glasses having a softening range at relatively low temperatures can be employed. In addition, there is the risk that the softened glass capillary when contacting the metal block, may adhere thereto. Gas burners have the disadvantage that they do not allow of operating under a protecting gas or in vacuum, the heat suplied to the filament is difficult to control and the heating is not uniform over the whole periphery of the glass capillary.

It is a principal object of the invention to provide, in combination with means for drawing out glass or ceramic enveloped molten metals into fine filaments, means to heat said metal.

Other objects and advantages will be apparent from a consideration of the specification and claim.

The heating device in accordance with the invention comprises a horizontal ceramic tube through which a protecting gas is passed and a coaxial resistor rod of carbon, graphite, silicon carbide or the like in said tube, the ends of said rod being clamped in water cooled copper jaws. Protective tube and resistor rod have a central bore transversely of their axis whereby the diameter of said rod decreases at a certain distance from said bore. Below the protective tube, one or more ring nozzles are provided in one or more circles around the bore whose perforations are so arranged as to direct jets of additional protecting gas converging toward the center of the bore.

The invention will be set forth in more detail with reference to the accompanying drawing illustrating a preferred embodiment thereof.

The sole figure of the drawing is an elevational view of the present invention.

In the drawing, the reference numeral 1 designates a metal filled glass capillary which is introduced from above through a vertical bore 2 of a horizontal ceramic protecting tube 3. Instead of the glass capillary tube, a glass enveloped wire may be used. The protecting tube 3 is supported on brackets or projections 4 of water cooled copper jaws or shoes 5. Said copper shoes 5 serve as current conductors for a carbon or graphite rod 6 coaxially disposed in the protective tube 3.

Two carbon rings 7 are pressed onto the ends of the carbon rod 6 to minimize the contact resistance between the copper shoes 5 and said rod; the copper shoes are applied against said rings. The carbon rod 6 is reinforced in its center portion which has the bore 2 receiving the capillary. The thickness of the center portion is at least so much increased that the cross section of the rod in the axis of the bore presents the same surface area as a cross section in the not reinforced portion. However, in order to obtain a heating zone of increased length the reinforcement may be made considerably stronger. The temperature produced in the bore 8 depends essentially on the resistance of the carbon rod, i.e., on its cross section. Any increase of the cross section of the rod in the area of the bore 8, which at this point would result in a somewhat decreased heat production, is compensated by a heat flux from the other portions of the rod towards the bore.

The carbon rings 7 have ducts 9 for the introduction of a protective gas, e.g. argon.

In order to prevent the entry of air through the bore 10 into the ceramic protective tube 3, an annular nozzle 11 is arranged below said bore which at its inner side has a circular series of perforations 12 to which protective gas is supplied through line 13. The jet of the gas impinges on the drawn glass coated wire 15 and cools the same. Due to the suction produced in the bore 8 in the carbon rod, the protective gas is drawn into the protective tube, provided that the distance between protective tube 3 and the ring nozzle 11 is not excessive. The annular water-filled cooling chamber 14 is arranged below the ring nozzle 11 for additional cooling of the drawn wire.

The device is particularly suitable for drawing wires of very high melting metals.

I claim:
1. A heating device for heating a metal filled capillary glass or ceramic tube and a wire drawn therefrom comprising a horizontal carbon resistor rod having two ends, a ceramic tube enclosing said rod in coaxial spaced relationship so as to provide an annular gas space between said rod and said tube, a protective gas in said gas space, water cooled copper shoes supporting the ends of said rod in electrical conductive connection therewith, registering bores in said rod and tube perpendicularly to the axis thereof, the diameter of said rod decreasing at a predetermined distance from said bore, and a ring nozzle below said tube, the openings of said nozzle being directed towards the center of said bore.

2. A heating device as claimed in claim 1 comprising carbon rings between said copper shoes and said rod, and gas inlet channels in said rings.

References Cited
UNITED STATES PATENTS

| | | | |
|---|---|---|---|
| 677,070 | 6/1901 | Eddy | 13—25 |
| 1,793,529 | 2/1931 | Taylor | 29—423 |
| 2,109,758 | 3/1938 | Tovceda | 219—427 X |
| 2,823,292 | 2/1958 | Kvnzle | 219—288 X |

RICHARD M. WOOD, Primary Examiner.

C. L. ALBRITTON, Assistant Examiner.